(12) United States Patent
Koettgen

(10) Patent No.: US 10,864,796 B2
(45) Date of Patent: Dec. 15, 2020

(54) ARRANGEMENT OF AT LEAST ONE TECHNICAL COMPONENT WITHIN A CAVITY IN AN INTERIOR OF A MOTOR VEHICLE

(71) Applicant: Dr. Ing. h.c. F. Porsche Aktiengesellschaft, Stuttgart (DE)

(72) Inventor: Christoph Koettgen, Sindelfingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 138 days.

(21) Appl. No.: 16/185,034

(22) Filed: Nov. 9, 2018

(65) Prior Publication Data
US 2019/0152288 A1    May 23, 2019

(30) Foreign Application Priority Data

Nov. 22, 2017  (DE) .......................... 10 2017 127 556
Nov. 28, 2017  (DE) .......................... 10 2017 128 090

(51) Int. Cl.
*B60H 1/34* (2006.01)
*B60H 1/00* (2006.01)
*F24F 13/08* (2006.01)

(52) U.S. Cl.
CPC ....... *B60H 1/00564* (2013.01); *B60H 1/3407* (2013.01); *F24F 13/08* (2013.01)

(58) Field of Classification Search
CPC ............. B60H 1/00564; B60H 1/3407; B60H 1/00507; B60H 1/34; B60H 1/3414; B60H 1/3421; B60R 13/02

USPC ................................................. 454/152–155
See application file for complete search history.

(56) References Cited

U.S. PATENT DOCUMENTS

| 10,071,615 | B2  | 9/2018  | Rottmann |
| 2008/0014855 | A1 | 1/2008 | Leserre |
| 2010/0254135 | A1* | 10/2010 | Bayat .................. F21V 23/0414 362/235 |
| 2014/0357178 | A1 | 12/2014 | Doll et al. |
| 2016/0361978 | A1 | 12/2016 | Groschopf |
| 2017/0113516 | A1 | 4/2017 | Rottmann et al. |

FOREIGN PATENT DOCUMENTS

| DE | 102014219081 A1 | 1/2016 |
| DE | 102014219902 A1 | 1/2016 |
| DE | 102015109068 A1 | 12/2016 |
| DE | 102015217230 A1 | 3/2017 |
| EP | 1162095 A1 | 12/2001 |

(Continued)

*Primary Examiner* — Vivek K Shirsat
*Assistant Examiner* — Ko-Wei Lin
(74) *Attorney, Agent, or Firm* — Leydig, Voit & Mayer, Ltd.

(57) ABSTRACT

An arrangement of at least one technical component within a cavity which is formed in an interior of a motor vehicle includes at least one masking structure arranged within a cavity between the technical component and at least one opening. The cavity includes, on a visible side, the at least one opening through which the at least one technical component is visible from outside. The at least one masking structure has a black, high-gloss outer surface at least in certain portions and is designed to at least partially optically mask the technical component by absorption and/or reflection of light entering the cavity through the at least one opening.

11 Claims, 3 Drawing Sheets

(56) References Cited

FOREIGN PATENT DOCUMENTS

| | | | |
|---|---|---|---|
| JP | 2014151862 A | * | 8/2014 |
| JP | 2014151862 A | | 8/2014 |
| RU | 2452632 C2 | | 6/2012 |

* cited by examiner

ARRANGEMENT OF AT LEAST ONE TECHNICAL COMPONENT WITHIN A CAVITY IN AN INTERIOR OF A MOTOR VEHICLE

CROSS REFERENCE TO RELATED APPLICATIONS

This application claims benefit to German Patent Application Nos. DE 10 2017 127 556.8, filed Nov. 22, 2017, and DE 10 2017 128 090.1, filed Nov. 28, 2017, both of which are hereby incorporated by reference herein.

FIELD

The present invention relates to an arrangement of at least one technical component within a cavity which is formed in an interior of a motor vehicle, wherein the cavity has, on a visible side, at least one opening through which the at least one technical component is visible from outside.

BACKGROUND

The prior art discloses arrangements in which at least one technical component is arranged within a cavity which is formed in an interior of a motor vehicle. Arrangements which should be mentioned by way of example in this connection are ones in which the at least one technical component and the cavity are parts of an air vent. Such an air vent can be arranged in particular in an instrument panel in the interior of the motor vehicle. A problem with such arrangements is that the technical component arranged within the cavity is visible from outside to an observer through the at least one opening and can thus adversely affect the optical appearance under certain circumstances. An air vent is known from DE 10 2015 109 068 A1, for example. In the latter there is provided, within the cavity, a technically required, cruciform central separation which is visible to an observer from outside.

SUMMARY

In an embodiment, the present invention provides an arrangement of a technical component within a cavity which is formed in an interior of a motor vehicle. The cavity has, on a visible side, an opening through which the technical component is visible from outside. The arrangement includes a masking structure arranged within the cavity between the technical component and the opening. The masking structure has a black, high-gloss outer surface at least in certain portions and is configured to at least partially optically mask the technical component by absorption and/or reflection of light entering the cavity through the opening.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1b shows a detail of a masking means of the arrangement according to FIG. 1a;

DETAILED DESCRIPTION

Figure 1A:
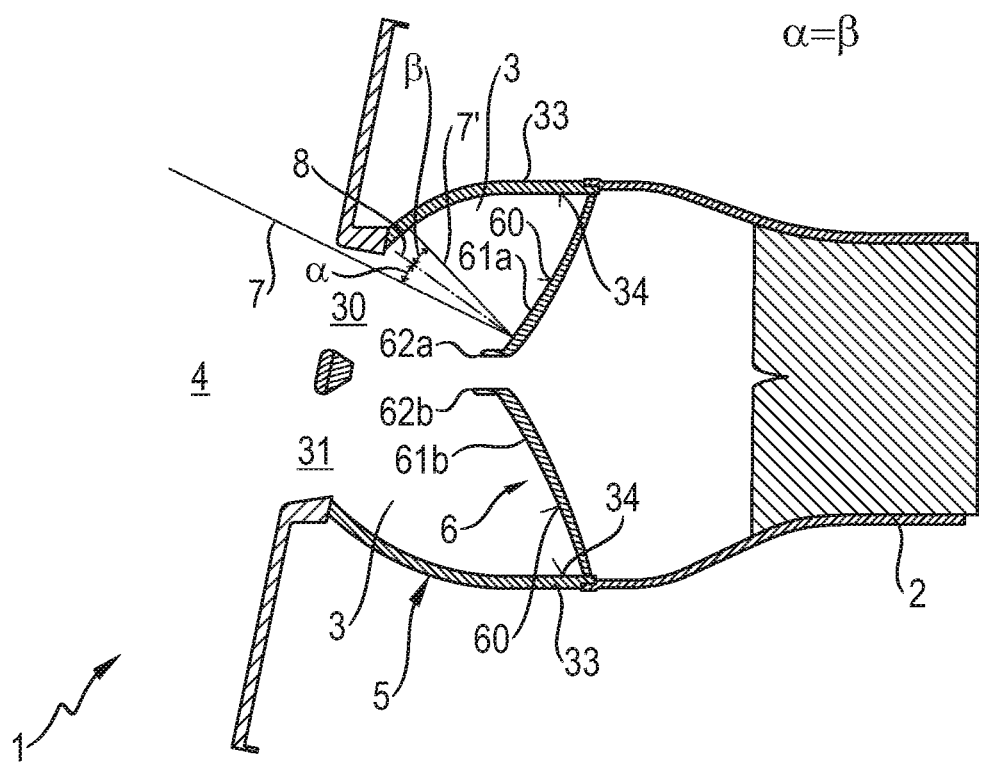
FIG. 1a shows a schematically greatly simplified illustration of an arrangement of a technical component within a cavity in an interior of a motor vehicle, which arrangement is configured according to a first exemplary embodiment of the present invention.

Embodiments of the invention provide arrangements of at least one technical component within a cavity which is formed in an interior of a motor vehicle, wherein the cavity has, on a visible side, at least one opening through which the at least one technical component is visible from outside, the arrangements having an improved optical appearance.

Arrangements according to embodiments of the invention are distinguished by the fact that at least one masking means is arranged within the cavity between the technical component and the at least one opening, has a black, high-gloss outer surface at least in certain portions and is designed to at least partially optically mask the technical component by absorption and/or reflection of light which enters the cavity through the at least one opening. Arrangements according to embodiments of the invention at least partially optically mask the at least one component accommodated within the cavity by virtue of the light-absorbing and/or light-reflecting design of the masking means arranged between said component and the at least one opening and to make said component at least partially invisible to an observer. Consequently, the optical appearance of the arrangement can be considerably improved. In order to ensure that that part of the light impinging the masking means that is not absorbed by the masking means itself is not diffusely scattered, the outer surface of the masking means that is black at least in certain portions is high-gloss. A diffuse scattering of the light not absorbed by the masking means would result in the fact that those regions in which this diffuse light scattering occurs would be visible from outside. The black outer surface of the masking means that is high-gloss at least in certain portions allows a defined reflection of the nonabsorbed fraction of the light in a certain direction.

In a preferred embodiment there can be provision that the masking means has at least one visible, optically adaptable region on its side facing the at least one opening of the cavity. This region is always visible and can be optically adapted in a wide variety of ways, such as, for example, be glossy, matt or colored, with the result that a targeted optical accentuation of the masking means is partially possible.

In order to further improve the optical appearance of the arrangement, it is proposed in an advantageous embodiment that the masking means is designed to completely optically mask the technical component by absorption and/or reflection of the light which enters the cavity through the at least one opening.

In a particularly advantageous embodiment, it is proposed that the black outer surface of the masking means has a number of reflection surface portions which are curved and/or inclined in such a way that they reflect a part of the light entering the cavity that is not absorbed by the masking means substantially only into the interior of the cavity. From a functional view, the cavity then forms a type of beam trap for the light entering it from outside.

In a preferred embodiment there can be provision that the cavity is defined by a wall arrangement which has a black surface. The black surface of the wall arrangement that points in the direction of the cavity can considerably improve the light absorption capacity of the wall arrangement.

The technical component can preferably have a surface which is black at least in certain portions, in particular in a region facing the at least one opening of the cavity. Consequently, the light absorption capacity of the technical component is improved in an advantageous manner.

In an advantageous embodiment, the cavity and the at least one technical component accommodated therein can be parts of an air vent. The air vent can be arranged in particular in an instrument panel of the motor vehicle.

Figure 1B:
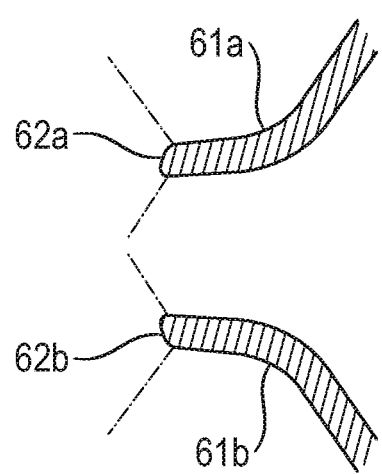

With reference to FIGS. 1a and 1b, a more detailed explanation will be given below for a first exemplary embodiment of an arrangement 1 of at least one technical component 2 within a cavity 3 which is formed in an interior 4 of a motor vehicle. The cavity 3 within which the technical component 2 is arranged is defined by a wall arrangement 33. In this exemplary embodiment and in the three other ones, the technical component 2 and the cavity 3 are parts of an air vent 5 which, in a manner known per se, can be arranged, for example, in an instrument panel in the interior 4 of the motor vehicle.

The technical component 2 can be an air flow influencing means, for example, by means of which the air flow of the air channeled into the interior 4 of the motor vehicle through the air vent 5 can be influenced. In its region, which forms a visible side, facing the interior 4 of the motor vehicle, the cavity 3 of the air vent 5 has a plurality of openings 30, 31 through which the air from the air vent 5 can flow into the interior 4 of the motor vehicle.

A problem with such an arrangement 1 having the openings 30, 31 on the visible side of the cavity 3 is that the technical component 2 arranged within the cavity 3 is visible to an observer from outside through these openings 30, 31. Consequently, the optical appearance of the arrangement 1 can be negatively affected.

In order to remedy this problem, a masking means 6 is arranged between the technical component 2 and the openings 30, 31 of the cavity 3 and is designed to at least partially, preferably completely, optically mask the technical component 2 by absorption and/or reflection of light which enters the cavity 3 from outside through the openings 30, 31. A merely partial masking may be appropriate in order to create an adaptable, visible geometry which differs from the technically given geometry of the component 2.

For this purpose, the masking means 6 has a black outer surface 60 at least in certain portions so as thereby to increase the light absorption capacity of the masking means 6. In order to ensure that that part of the light impinging the masking means 6 that is not absorbed by the masking means 6 for its part is not diffusely scattered, the black outer surface 60 of the masking means 6 is high-gloss. By contrast, a diffuse scattering of the light not absorbed by the masking means 6 would result in the fact that those regions in which this diffuse light scattering occurs would be visible to an observer from outside through the openings 30, 31 of the cavity 3.

The advantageously high-gloss, black outer surface 60 of the masking means 6 allows a defined reflection in a certain direction of the fraction, which is not absorbed by said means, of the light entering the cavity 3. In this exemplary embodiment and in the other ones, the black outer surface 60 of the masking means 6 has a number of reflection surface portions 61a, 61b which are curved and/or inclined in such a way that they reflect the part of the light entering the cavity 3 that is not absorbed by the masking means 6 substantially only into the interior of the cavity 3. This situation can also be seen in FIG. 1a in which an incident light beam 7, a perpendicular 8 and a reflected light beam 7' are illustrated. According to the rules of geometrical optics, the light beam 7 entering the cavity 3 is at least partially reflected at a first reflection surface portion 61a of the outer surface 60 of the masking means 6. For the angle of incidence $\alpha$ of the incident light beam 7 and the angle of reflection $\beta$ of the reflected light beam 7', the following relationship holds with respect to the perpendicular 8: $\alpha=\beta$ (angle of incidence=angle of reflection).

The wall arrangement 33 which defines the cavity 3 can preferably have a black surface 34. The black surface 34 of the wall arrangement 33 that points in the direction of the cavity 3 can considerably improve the light absorption capacity of the wall arrangement 33.

The technical component 2 can be optionally (and thus not necessarily) at least partially black, with the result that its light absorption capacity, in particular at least in a region facing the two openings 30, 31 of the cavity 3, can be increased.

These above-described measures make it possible to improve the optical appearance of the arrangement 1 since the technical component 2 accommodated within the cavity 3 is at least partially, preferably completely, invisible to an observer. This is because the observer observes the black, high-gloss outer surface 60 of the masking means 6 that reflects only black surfaces from the inside of the cavity 3 and is thus dark to the greatest possible extent and appears virtually invisible.

It becomes clear from the detail view in FIG. 1b that the masking means 6 has visible, optically adaptable regions 62a, 62b on its side facing the two openings 30, 31 of the cavity 3. These regions 62a, 62b are always visible and can be optically adapted in a wide variety of ways, such as, for example, be glossy, matt or colored, with the result that a targeted optical accentuation of the masking means 6 is partially possible. The transitions from the visible regions 62a, 62b to the reflection surface portions 61a, 61b have each been indicated by dot-dash lines in FIG. 1a.

Figure 2:
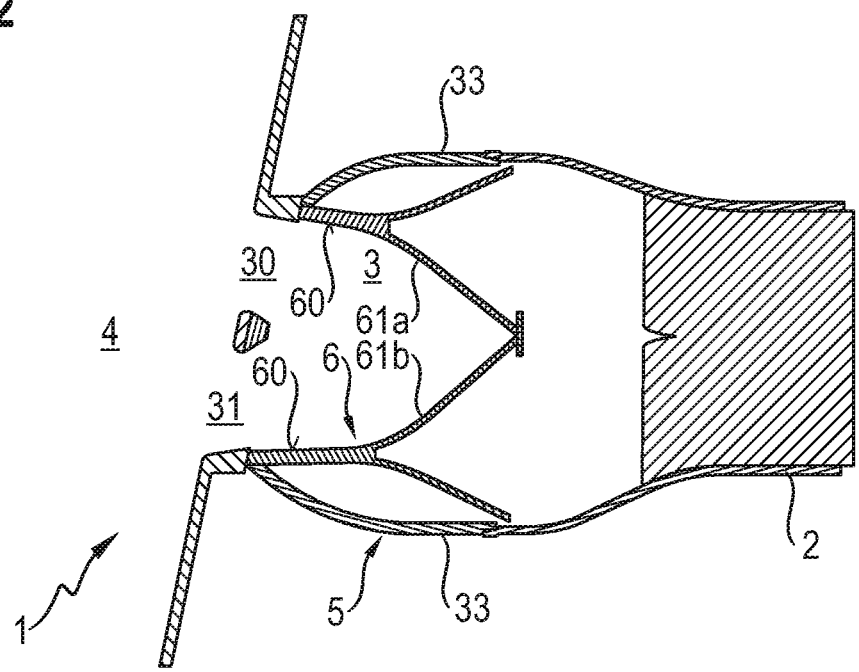
FIG. 2 shows a schematically greatly simplified illustration of an arrangement of a technical component within a cavity in an interior of a motor vehicle, which arrangement is configured according to a second exemplary embodiment of the present invention.
Figure 3:
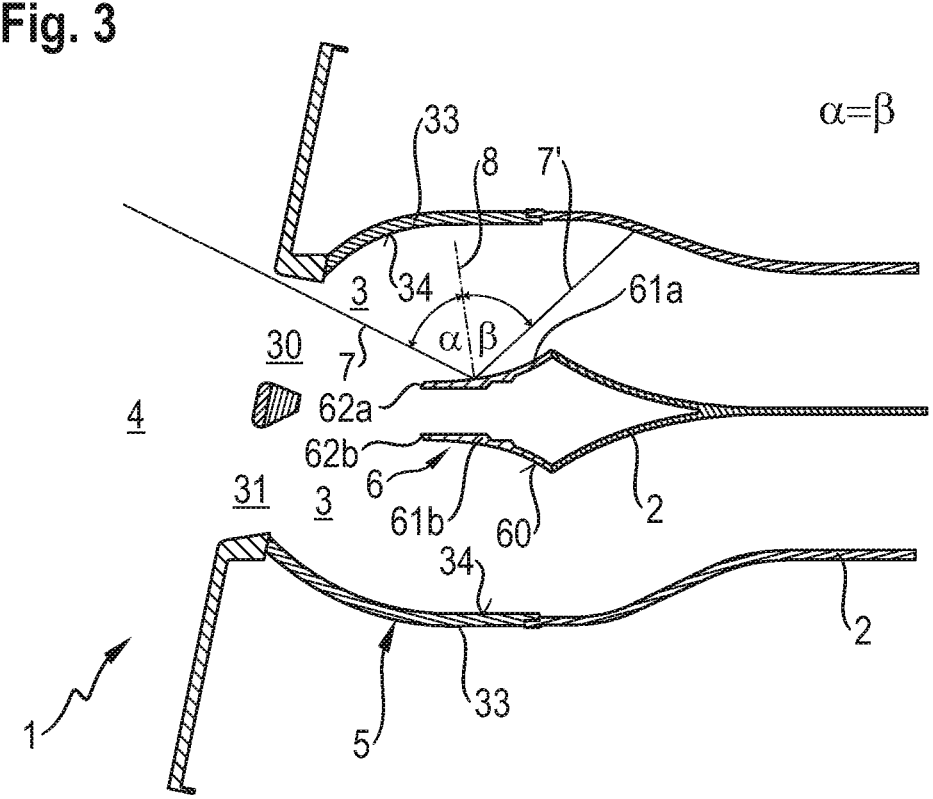
FIG. 3 shows a schematically greatly simplified illustration of an arrangement of a technical component within a cavity in an interior of a motor vehicle, which arrangement is configured according to a third exemplary embodiment of the present invention.
Figure 4:
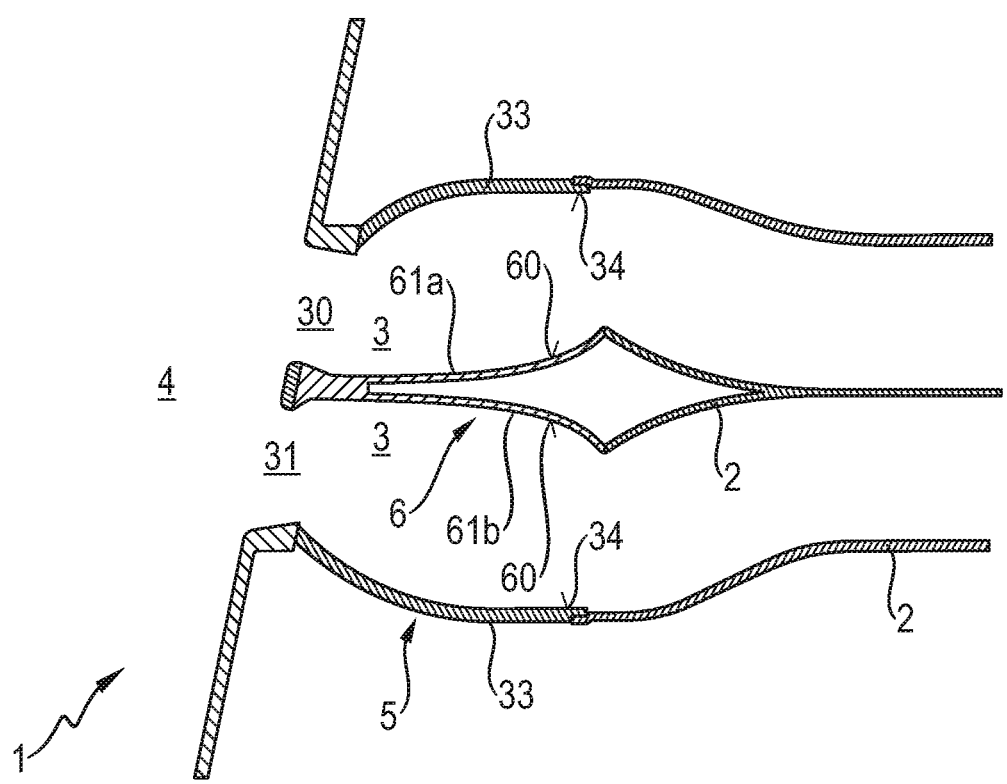
FIG. 4 shows a schematically greatly simplified illustration of an arrangement of a technical component within a cavity in an interior of a motor vehicle, which arrangement is configured according to a fourth exemplary embodiment of the present invention.

The exemplary embodiments shown in FIGS. 2 to 4 differ from the above-described first exemplary embodiment in particular through a different design of the masking means 6, and therefore a repeated detailed description is not required at this point. In FIGS. 2 to 4, identical or functionally identical parts of the arrangement 1 have accordingly been provided with the same reference signs as in FIG. 1a. In the embodiment according to FIG. 3, the masking means 6 likewise has visible, optically adaptable regions 62a, 62b. The embodiments according to FIG. 2 and FIG. 4 differ from the variants shown in FIGS. 1a and 3 in that the visible, optically adaptable regions 62a, 62b have been avoided in a targeted manner, with the result that the cavity 3 or the technical component 2 can be completely masked.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air vent arrangement formed in an interior of a motor vehicle, the air vent arrangement comprising:
    a cavity having, on a visible side adjacent to the interior of the motor vehicle, a first opening and a second opening separated by a central separator
    an air flow deflector disposed in an interior of the cavity; and
    a masking structure arranged within the cavity between, in a direction of air flow, the air flow deflector and the first and second openings, the masking structure including a first reflection surface portion and a second reflection surface portion, each of the first reflection surface portion and the second reflection surface portion having a black, reflective outer surface,
    wherein the first reflection surface portion is configured to at least partially optically mask the air flow deflector by reflecting light entering the cavity through the first opening, and
    wherein the second reflection surface portion is configured to at least partially optically mask the air flow deflector by reflecting light entering the cavity through the second opening.

2. The arrangement as claimed in claim 1, wherein the masking structure has at least one visible region on a first side facing at least one of the first opening and the second opening of the cavity.

3. The arrangement as claimed in claim 1, wherein the masking structure is configured to completely optically mask the air flow deflector by absorption and/or reflection of light.

4. The arrangement as claimed in claim 1, wherein the black outer surface of the masking structure has a number of reflection surface portions that are curved and/or inclined so as to reflect a part of the light entering the cavity that is not absorbed by the masking structure substantially only into an interior of the cavity.

5. The arrangement as claimed in claim 1, wherein the cavity is defined by a wall arrangement having a black surface.

6. The arrangement as claimed in claim 1, wherein the air flow deflector has a surface, wherein at least a portion of the surface of the air flow deflector is black.

7. The arrangement as claimed in claim 1, wherein the first reflection surface portion is configured to at least partially optically mask the air flow deflector by reflecting, in a first direction, the light entering the first opening of the cavity towards a first wall of a wall arrangement that defines the cavity, and
    wherein the second reflection surface portion is configured to at least partially optically mask the air flow deflector by reflecting, in a second direction opposite the first direction, the light entering the second opening of the cavity towards a second wall of the wall arrangement.

8. The arrangement as claim in claim 7, wherein the masking structure further includes a first visible region and a second visible region.

9. The arrangement as claimed in claim 8, wherein the first visible region is connected, via a transition region, to the first reflection surface portion and the second visible region is connected, via a second transition region, to the second reflection surface portion.

10. The arrangement as claimed in claim 9, wherein the first visible region and the first reflection surface portion are connected to the first wall of the wall arrangement,
    wherein the second visible region and the second reflection surface portion are connected to the second wall of the wall arrangement, and
    wherein a gap is disposed between (i) the combination of the first visible region and the first reflection surface portion and (ii) the combination of the second reflection surface portion and the second wall of the wall arrangement.

11. The arrangement as claimed in 7, wherein the first reflection surface portion is configured to reflect, in the first direction, light beams entering the first opening of the cavity in the first direction with an angle of reflection that is equal to an angle of incidence of the light upon the first reflection surface portion, and
    wherein the second reflection surface portion is configured to reflect, in the second direction, light beams entering the second opening of the cavity in the second direction with an angle of reflection that is equal to an angle of incidence of the light upon the second reflection surface portion.

* * * * *